March 7, 1961 R. C. HOLCOMBE 2,974,267
SHUTTLE CAR WITH TRACTION MOTOR CONTROL
Filed Jan. 13, 1959 3 Sheets-Sheet 1
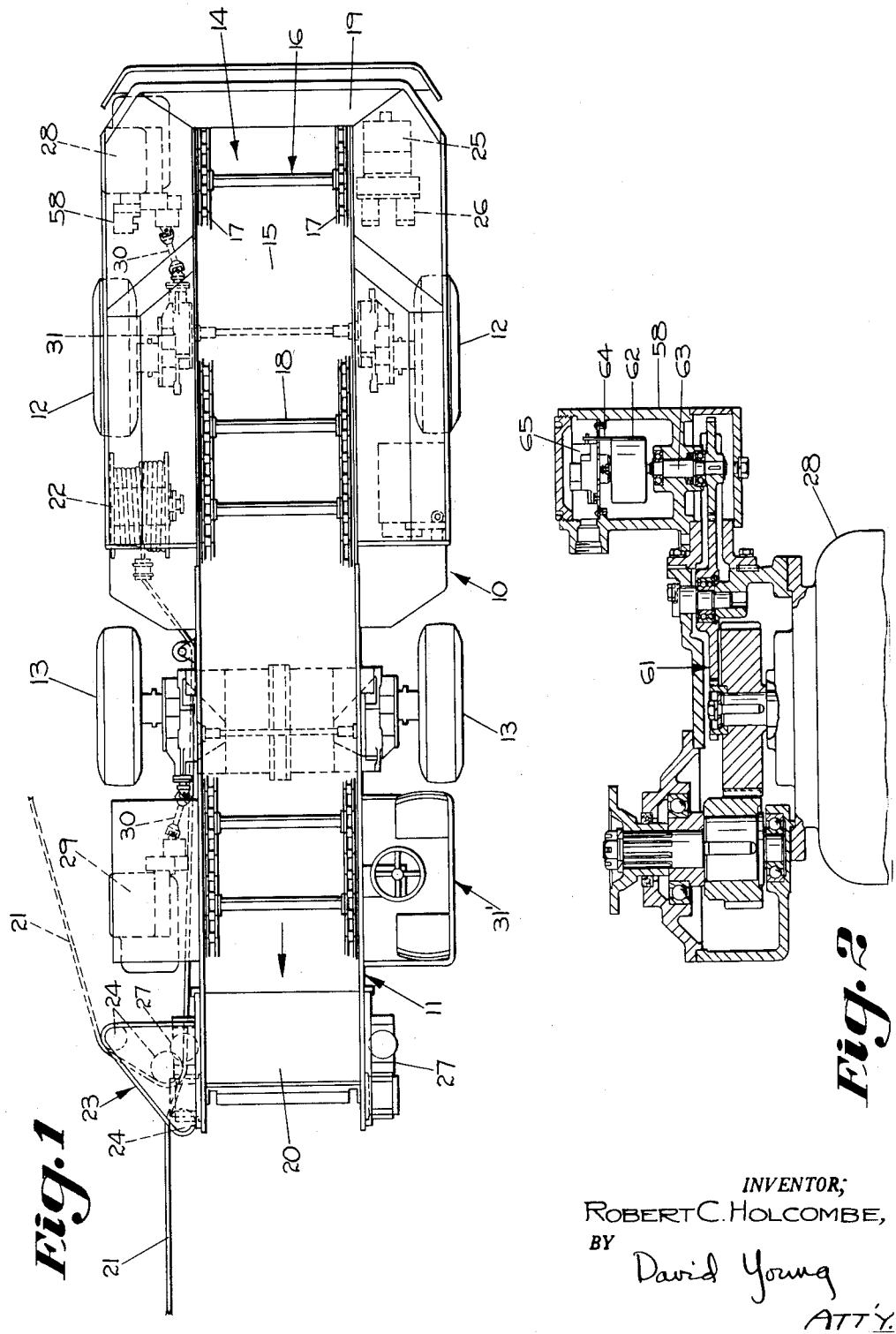
INVENTOR:
ROBERT C. HOLCOMBE,
BY David Young
ATT'Y.

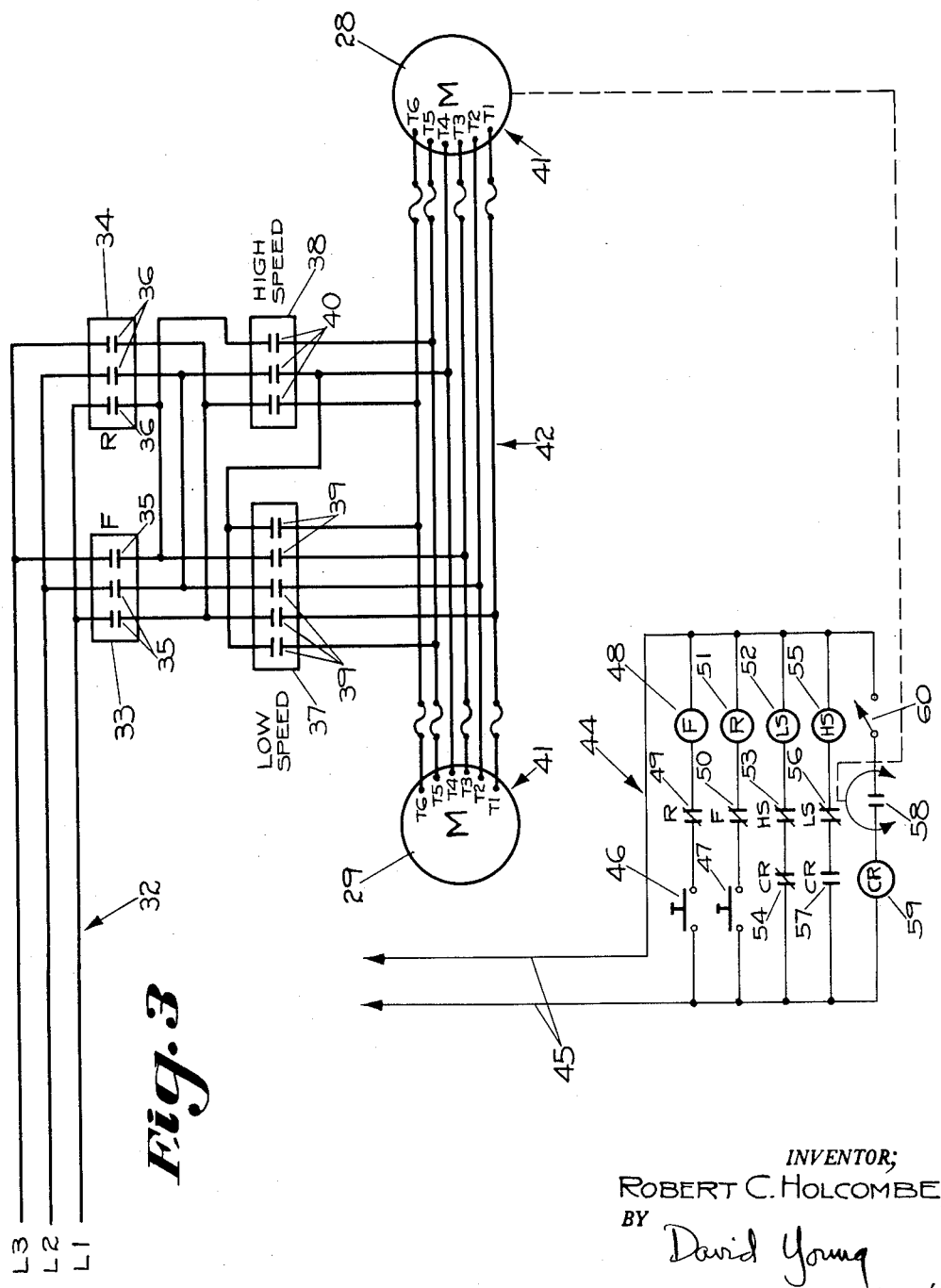

United States Patent Office 2,974,267
Patented Mar. 7, 1961

2,974,267

SHUTTLE CAR WITH TRACTION MOTOR CONTROL

Robert C. Holcombe, Dublin, Ohio, assignor to The Jeffrey Manufacturing Company, a corporation of Ohio Filed Jan. 13, 1959, Ser. No. 786,613

10 Claims. (Cl. 318—224)

The instant invention relates to shuttle cars such as are particularly adapted for the transportation of coal in a coal mine, and more particularly to the control of the traction motors in such shuttle cars which supply the power for propelling the shuttle car.

Shuttle cars to which the instant invention relates are customarily used in coal mines for the purpose of receiving the coal which is discharged from a mining or loading machine. The shuttle cars are characteristically formed with a longitudinally extending compartment in which the coal is loaded. The shuttle cars, after being loaded with coal, are run from the area of the mine face to a main conveyor line or other discharge point, where the shuttle car discharges the coal onto a conveyor belt or other conveyance which carries the coal out of the mine.

The shuttle cars are operated by electrical motors, and include a power supply cable which trails the car and extends to a power source in the mine from which power is supplied to the motors for driving them. In starting the shuttle car from standstill, it is required that there be a maximum supply of torque from the traction motors to accelerate the shuttle car. After the shuttle car is started in movement, the torque required from the traction motors is reduced, and it is desired that the motors operate to propel the shuttle car at its maximum speed, for quickly moving to the point at which the shuttle car discharges its load, and returning the empty shuttle car to the area of the mine face to receive another load of coal.

In order to satisfy the aforementioned torque requirements for propelling the shuttle car, two speed, single winding, constant horsepower, alternating current motors are used. These motors are adapted to operate in two speed ranges, one of which is a low speed range in which the motor delivers a high torque, and the other is a high speed range in which the motor delivers a lower torque. In accordance with the instant invention there is provided means for smoothly and efficiently effecting the changeover from the low speed range of the motor to the high speed range thereof, as is determined by the speed of the shuttle car.

It is, accordingly, an object of the instant invention to provide a shuttle car including a traction motor adapted to operate in low and high speed ranges, in which there is provided means for effecting a changeover in the operation of the motor from one speed range to the other speed range.

It is a further object of the instant invention to provide a shuttle car including a traction motor adapted to operate in a high speed range and a low speed range, and including speed responsive means for effecting a changeover in the operation of the traction motor from one speed range to the other speed range in accordance with the speed of the shuttle car.

It is another object of the instant invention to provide a shuttle car including a traction motor adapted to operate in a low speed range and a high speed range, and comprising a control circuit for effecting a changeover in the operation of the traction motor from one speed range to the other speed range, in which the control circuit comprises speed responsive means for effecting the changeover in accordance with the speed of the shuttle car.

It is also an object of the instant invention to provide a shuttle car having a traction motor adapted to operate in a low speed range and a high speed range, and a control circuit adapted to effect the changeover of the operation of the motor from one speed range to the other speed range, in which the control circuit comprises a speed responsive switch operated by the traction motor to effect the changeover in accordance with the speed of the shuttle car.

Other objects of the invention will appear hereinafter, the novel features and combinations being set forth in the appended claims.

In the accompanying drawings:

Fig. 1 is a plan view of a shuttle car embodying the instant invention;

Fig. 2 is a sectional view showing the driving connections between the traction motor and the speed responsive switch;

Fig. 3 is a circuit diagram of the traction motor control circuits; and

Figure 4:
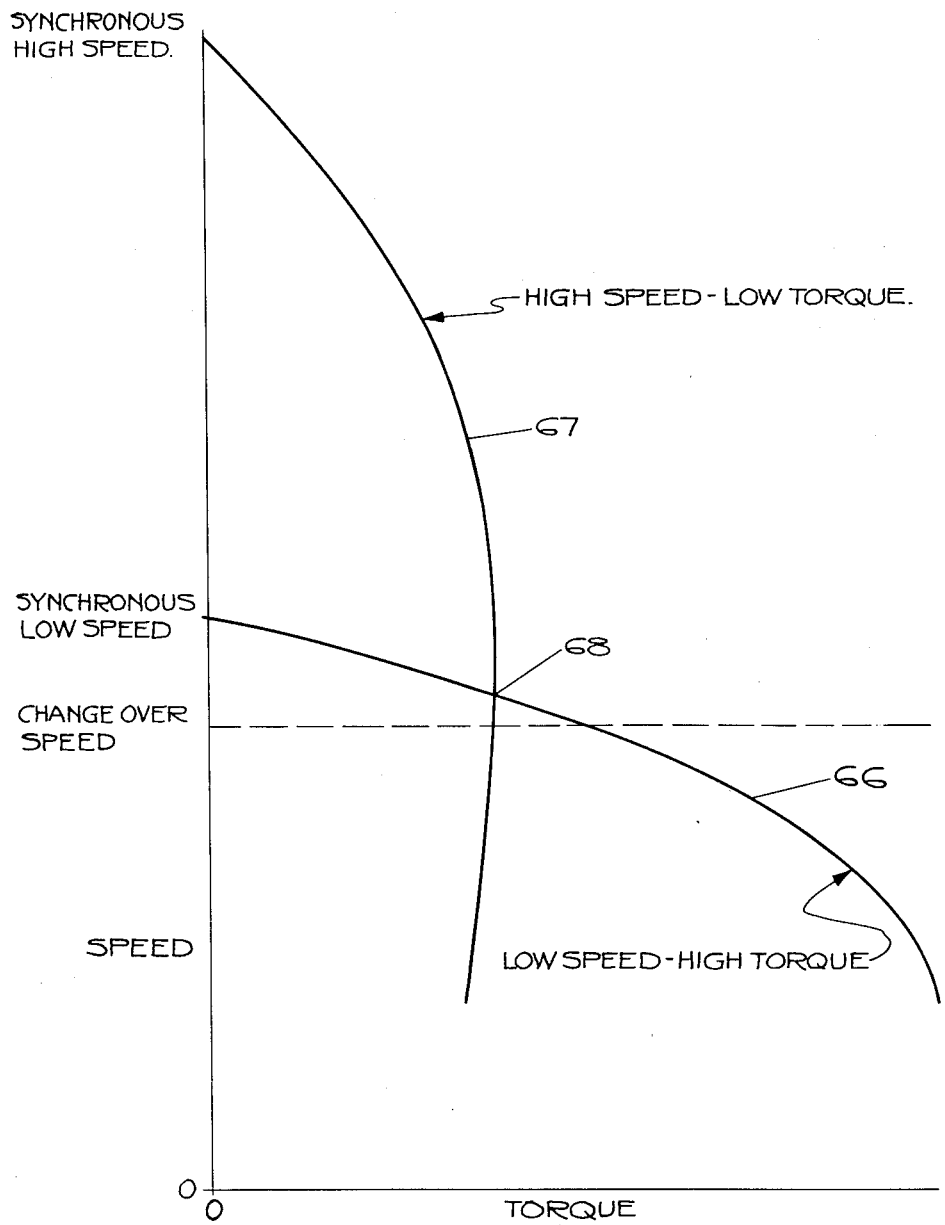
Fig. 4 shows the speed-torque curves of the traction motor.

A shuttle car 10 embodying the instant invention is illustrated in Fig. 1 of the drawings. The shuttle car comprises a main frame 11 supported on a pair of oppositely disposed front wheels 12 and a pair of oppositely disposed rear wheels 13. The main frame 11 is formed with a longitudinally extending compartment 14 into which the coal is loaded from a mining machine or a loading machine, or other like apparatus. The compartment 14 is formed with a flat bed 15 in the bottom thereof, and a conveyor 16 is disposed on the bed 15 and operated along the length of the bed 15. The conveyor 16 comprises oppositely disposed, endless chains 17, placed one at each side of the bed 15. A plurality of equally spaced, transversely extending flights 18 are secured to the chains 17, and are driven by the chains 17 along the length of the bed 15, with the return flight of the conveyor 16 being disposed below the bed 15. The coal is loaded into the compartment 14 of the shuttle car 10 at the front end 19 thereof, and after sufficient coal has been loaded to fill the front portion of the compartment 14, the conveyor 16 is operated to move the coal a short distance towards the rear end 20 of the shuttle car 10. Additional coal is then loaded into the compartment 14 at the front end 19 of the shuttle car 10, and the conveyor 16 is again operated to move the coal rearwardly. This operation is continued until the compartment 14 is completely filled with coal, following which the shuttle car 10 is driven to an unloading point, which is usually at a main belt line in the mine, at which the coal is discharged from the rear end 20 of the shuttle car 10 by operation of the conveyor 16.

Power for operating the shuttle car 10 is supplied through a trailing electrical cable 21, which is wound on a cable reel 22 at one side of the shuttle car 10. The trailing cable 21 is trained over an assembly of pulleys 23 at the rear of the shuttle car 10, and as seen in Fig. 1, the pulleys 24 of the pulley assembly 23 are arranged to permit the trailing cable 21 to extend either forwardly or rearwardly with respect to the shuttle car 10, depending on the location of the shuttle car with respect to the power source to which the end of the cable 21 is connected.

The shuttle car 10 includes an electrical motor 25 which is adapted to drive a hydraulic pump 26 that supplies hydraulic fluid to hydraulic motors 27, oppositely disposed at the rear end 20 of the shuttle car 10. The hydraulic motors 27 drive the conveyor 16.

The shuttle car 10 additionally includes a front traction motor 28 and a rear traction motor 29, which are connected together in circuit, as will be explained in greater detail hereinafter. Each of the traction motors 28, 29 is an electrical motor driven by power supplied through the cable 21. The front traction motor 28 drives the front wheels 12, and the rear traction motor 29 drives the rear wheels 13, to propel the shuttle car 10. Each traction motor 28, 29 is connected to its respective set of wheels 12, 13 by a universally jointed drive shaft 30 which delivers the power of the traction motors 28, 29 to a gear box 31 from which the wheels 12, 13 are driven. Each of the front wheels 12 and the rear wheels 13 is adapted to be turned for the purpose of steering the shuttle car 10, this being a characteristic feature of shuttle cars. The shuttle car 10 further includes an operator's station 31' from which the machine operator controls the operation of the shuttle car 10.

In accordance with the instant invention the traction motors 28, 29 are each adapted to operate in two speed ranges, one being a low speed range in which the traction motors 28, 29 deliver a high torque for supplying the high torque requirements in starting the shuttle car from standstill and during initial acceleration, and the other being a high speed range in which the traction motors 28, 29 supply a low torque after the shuttle car has attained speed, and there are lower torque requirements for continuing the acceleration of the shuttle car to its maximum speed. A two speed, single winding, constant horsepower, three phase, alternating current motor has the desired operating characteristics for driving the shuttle car 10 in a low speed range in which the traction motors 28, 29 supply a high torque, and in a high speed range in which the traction motors 28, 29 supply a low torque.

In Fig. 3 there is illustrated the electrical circuit for the traction motors 28, 29, which are each two speed, single winding, constant horsepower, three phase, alternating current motors. Power is supplied to the motors 28, 29 from power lines 32, designated L1, L2, L3. The power lines 32 are connected to a forward contactor 33 and to a reverse contactor 34. The forward contactor 33 comprises three normally open switches 35, with one switch 35 being connected to each of the power lines 32. The reverse contactor 34 similarly comprises three normally open switches 36, which are similarly connected to the power lines 32, with the exception that the connections of the switches 36 is reversed to reverse the direction of operation of the traction motors 28, 29. The circuit further includes a low speed contactor 37 and a high speed contactor 38. The low speed contactor 37 comprises five normally open switches 39 which connect the power lines 32 to the traction motors 28, 29 for operation of the latter in the low speed range. The high speed contactor 38 comprises three normally open switches 40, which are adapted to connect the power lines 32 to the traction motors 28, 29 for operation of the latter in the high speed range.

Each of the motors 28, 29 comprises six terminals 41, designated T1, T2, T3, T4, T5, T6, for the connection thereto of six electrical lines 42. The connection of the power lines 32 to the electrical lines 42, as made through either the low speed contactor 37 or the high speed contactor 38, determines whether the motors 28, 29 operate in the low speed range or the high speed range. The low speed contactor 37 is connected to the electrical lines 42 to supply power to terminal T1, T2, and T3, and to connect the terminals T4, T5 and T6 together. With the power lines 32 thus connected to the motors 28, 29, each motor operates with eight poles which sets the motors 28, 29 for operation in the low speed range in which there is delivered a high torque. For high speed operation of the traction motors 28, 29, the high speed contactor 38 is adapted to connect the power lines 32 to terminals T4, T5, T6 of the motors 28, 29, thereby setting the motors 28, 29 with four poles, for operation of the motors 28, 29 in the high speed range in which there is delivered a low torque.

There is provided a control circuit 44 for controlling the operation of the several contactors 33, 34, 37, 38. Power is delivered to the control circuit 44 for operation thereof by lines 45. The control circuit 44 comprises a forward switch 46 for operating the shuttle car 10 in the forward direction, and a reverse switch 47 for operating the shutter car 10 in the reverse direction. The switches 46, 47 may be connected to foot pedals or hand levers for operation thereof, and each of the switches 46, 47 is connected across the lines 45. The forward switch 46 has connected in series therewith a forward contactor coil 48 and a reverse, normally closed interlock 49. The forward contactor coil 48 is energized upon closing of the forward switch 46 and operates to close the forward contactor 33, thereby closing the circuit to the motors 28, 29 for forward operation of the latter. The forward contactor coil 48 is mechanically connected to a forward, normally closed interlock 50, which is connected in series with the reverse switch 47. Upon energization of the forward contactor coil 48 the forward, normally closed interlock 50 is opened for the purpose of preventing operation of the reverse contactor 34. In series with the reverse switch 47 there is connected a reverse contactor coil 51 which operates to close the reverse contactor 34. Upon closing the reverse switch 47 the reverse contactor coil 51 is energized to close the reverse contactor 34 for setting the motor circuits for operation of the traction motors 28, 29 in reverse. The reverse contactor coil 51 is mechanically connected to the reverse, normally closed interlock 49, and upon energization of the reverse contactor coil 51, the reverse, normally closed interlock 49 is opened, so that the circuit to the forward contactor coil 48 cannot be closed, thereby preventing operation of the forward contactor 33.

A low speed contactor coil 52 is connected across the lines 45 in series with a high speed, normally closed interlock 53 and a control relay, normally closed interlock 54. The low speed contactor coil 52 operates the low speed contactor 37, and upon energization of the low speed contactor coil 52, the low speed contactor 37 is closed. Also connected across the lines 45 is a high speed contactor coil 55, which is connected in series with a low speed, normally closed interlock 56 and a control relay, normally open interlock 57. The low speed contactor coil 52 is connected to the low speed, normally closed interlock 56, to open the latter upon energization of the low speed contactor coil 52, whereby the circuit to the high speed contactor coil 55 cannot be closed when the low speed contactor coil 52 is energized, and the high speed contactor 38 remains open. Similarly, the high speed contactor coil 55 is connected to the high speed, normally closed interlock 53, and upon energization of the high speed contactor coil 55, the high speed, normally closed interlock 53 is opened, thereby de-energizing the low speed contactor coil 52, and maintaining the low speed contactor 37 open.

A speed responsive switch 58 is connected across the lines 45, and there is connected in series therewith a control relay coil 59 and a normally open, manually operated switch 60. Energization of the control relay coil 59 closes the control relay, normally open interlock 57, and opens the control relay, normally closed interlock 54. Opening of the control relay, normally closed interlock 54 de-energizes the low speed contactor coil 52, and closing of the control relay, normally open interlock 57 energizes the high speed contactor coil 55, thereby connecting the traction motors 28, 29 for operation thereof in the high speed range. During normal operation of the shuttle car 10 in which it operates at low and high speeds, the manual switch 60 is closed to permit operation of the control relay coil 59 for changing from low speed to high speed. However, when it is desired to operate in low speed only, the manual switch 60 is maintained open, which prevents energization of the control relay coil 59, and thereby prevents energization of the high speed contactor coil 55.

The speed responsive switch 58 is mechanically connected to traction motor 28 by a gear train 61 (Fig. 2). The speed responsive switch 58 may be of a commercially available type which comprises a rotor 62 driven by the shaft 63 which is rotated by the gear train 61. The rotor 62 comprises a switch actuating lever 64 which extends to a switch assembly 65. The speed responsive switch 58 is operated by the gear train 61 in accordance with the speed of the motor 28, and the speed responsive switch 58 will open or close in accordance with the speed of the motor 28. It will be understood that the speed responsive switch 58 may be pre-set to close or open at a selected motor speed, and in accordance with this invention the speed responsive switch 58 is so pre-set as is explained in greater detail hereinafter.

Referring to Fig. 4, there is shown therein the curve 66 which is a plot of the speed-torque characteristic in the low speed range of operation of the two speed, single winding, constant horsepower, three phase, alternating current motor, which is utilized as a traction motor in the shuttle car 10. The maximum speed of the motor in the low speed range is at zero torque and at the synchronous low speed. The curve 67 is a plot of the speed-torque characteristic of the two speed, single winding, constant horsepower, three phase, alternating current motor in the high speed range of operation thereof, in which the maximum speed of the motor is at zero torque and synchronous high speed. Comparison of the curves 66, 67 shows that the motor delivers substantially lower values of torque in the high speed range of operation, than in the low speed range of operation. The curves 66, 67 intersect at point 68 at which the speeds and torques on the curves 66, 67 are equal. In effecting a changeover in the operation of the traction motors 28, 29 from the low speed range to the high speed range, the ideal condition would be to make this changeover at the point 68. However, in practice the changeover is made at a lower speed, at the speed identified as changeover speed, for the reason that it frequently occurs that the supply voltage to the shuttle car 10 in the mine is less than that ideally required for operation of the shuttle car 10, due to the various loads that are placed on the power source. Due to the fact that the shuttle car may be operating at a lower than rated voltage, the traction motors 28, 29 may not develop sufficient speed in the low speed range to reach the point 68 on the low speed curve 66, and it is for this reason that the changeover speed is set at a lower value than that at the common point 68. Another consideration in this respect is that the speed responsive switch 58 may go out of adjustment during the course of operation thereof, so that it will not operate at exactly the speed for which it was initially set. With the speed responsive switch 58 initially set for a speed below the common point 68 of the low speed and high speed curves 66, 67, there is provided a substantial range of speed to allow for such maladjustment, until it is discovered and corrected. If the speed responsive switch is set for the speed at the common point 68 or at a higher speed, there is only a narrow range of speed between the common point 68 and the synchronous low speed, and if the traction motors 28, 29 operating in the low speed range are supplied with insufficient voltage to reach the speed at common point 68 or a higher speed, the changeover to the high speed range of operation of the motors 28, 29 may never be accomplished.

Referring again to the circuit diagrams in Fig. 3, and particularly to the control circuit 44, it is seen that the control circuit 44 is initially set up for operation of the traction motors 28, 29 in the low speed range, this being accomplished by the presence of the control relay, normally open interlock 57. Thus, it is impossible to start the shuttle car from standstill in the high speed range. If it is desired to operate the shuttle car 10 only in the low speed range then the manual switch 60 is retained in open position. However, when it is desired to operate in both the low speed range and the high speed range the switch 60 is closed. When the shuttle car 10 is started up in the low speed range of the motors 28, 29 and accelerated to the changeover speed, the speed responsive switch 58 is closed, energizing the control relay coil 59, which closes the control relay interlock 57 and opens the control relay interlock 54, thereby de-energizing the low speed contactor coil 52 to open the low speed contactor 37, and energizing the high speed contactor coil 55, closing the high speed contactor 38. Simultaneously, energization of the high speed contactor coil 55 opens the high speed interlock 53 to prevent energization of the low speed contactor coil 52, while the traction motors 28, 29 are operating in the high speed range, and de-energization of the low speed contactor coil 52 closes the low speed interlock 56 to permit energization of the high speed contactor coil 55. The low speed and high speed contactor circuits are operative independently of the forward and reverse circuits, so that the traction motors 28, 29 may be operated in high and low speeds irrespective of whether the shuttle car 10 is driven in forward or reverse directions. It will be understood that with the control circuit 44 set for high speed operation of the traction motors 28, 29, the shuttle car operator may release either the forward or reverse switches 46, 47 to cut off the power to the traction motors 28, 29, as when coasting. Should the shuttle car while coasting lose speed, to a point below the changeover speed, when the power is reapplied the speed responsive switch 58 will be open and the traction motors 28, 29 will be operated in the low speed range to provide the higher torque required to accelerate the shuttle car 10 to the changeover speed.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a shuttle car comprising a motor for operating traction means to propel the shuttle car, means for connecting a source of power to the motor to drive the motor in a low speed range in which the motor delivers a high torque, alternate means for connecting the source of power to the motor to drive the motor in a high speed range in which the motor delivers a low torque, said motor having a speed-torque characteristic common to the low speed range and the high speed range, and speed responsive means operative at a motor speed at least approximately equal to the motor speed at said common speed-torque characteristic for deactivating one of said connecting means and activating the other of said connecting means to connect the source of power to the motor in accordance with the speed of the motor.

2. In a shuttle car comprising a motor for operating traction means to propel the shuttle car, means for connecting a source of power to the motor to drive the motor in a low speed range in which the motor delivers a high torque, alternate means for connecting the source of power to the motor to drive the motor in a high speed range in which the motor delivers a low torque, said motor having a speed-torque characteristic common to the low speed range and the high speed range, and a control circuit for alternately activating said connecting means, said control circuit including speed responsive means operative at a speed in the low speed range at least approximately equal to the motor speed at said common speed-torque characteristic for deactivating the first said connecting means and activating the alternate connecting means to drive the motor in the high speed range.

3. In a shuttle car comprising a motor for operating traction means to propel the shuttle car, means for connecting the source of power to the motor to drive the motor in a low speed range in which the motor delivers a high torque, alternate means for connecting the source of power to the motor to drive the motor in a high speed range in which the motor delivers a low torque, said motor having a speed-torque characteristic common to the low speed range and the high speed range, and a control circuit for alternately activating said connecting means, said control circuit including speed responsive means operative at a speed in the high speed range at least approximately equal to the motor speed at said common speed-torque characteristic for deactivating said alternate connecting means and activating the first said connecting means to drive the motor in the low speed range.

4. In a shuttle car comprising a motor for operating traction means to propel the shuttle car, said motor being adapted to operate in a low speed range in which the motor delivers a high torque and a high speed range in which the motor delivers a low torque, said motor having a speed-torque characteristic common to the low speed range and the high speed range, said motor comprising electrical terminals for connecting a source of power to the motor to drive the motor, means for selectively connecting the source of power to the motor terminals to drive the motor in the low speed range, alternate means for selectively connecting the source of power to the motor terminals to drive the motor in the high speed range, and a control circuit for alternately activating said connecting means, said control circuit including speed responsive means operative at a motor speed at least approximately equal to the motor speed at said common speed-torque characteristic for deactivating one of said connecting means and activating the other of said connecting means to connect the source of power to the terminals in accordance with the speed of the motor.

5. In a shuttle car comprising a motor for operating traction means to propel the shuttle car, means for connecting a source of power to the motor to drive the motor in a low speed range in which the motor delivers a high torque, alternate means for connecting the source of power to the motor to drive the motor in a high speed range in which the motor delivers a low torque, said motor having a speed-torque characteristic common to the low speed range and the high speed range, and a control circuit including means for alternately activating said connecting means, and a speed responsive switch in said control circuit operative at a motor speed at least approximately equal to the motor speed at said common speed-torque characteristic for deactivating one of said connecting means and activating the other of said connecting means to connect the source of power to the motor in accordance with the speed of the motor.

6. In a shuttle car comprising a motor for operating traction means to propel the shuttle car, means for connecting a source of power to the motor to drive the motor in a low speed range in which the motor delivers a high torque, alternate means for connecting the source of power to the motor to drive the motor in a high speed range in which the motor delivers a low torque, said motor having a speed-torque characteristic common to the low speed range and the high speed range, and a control circuit including means for alternately activating said connecting means, and a speed responsive switch in said control circuit operative at a motor speed at least approximately equal to the motor speed at said common speed-torque characteristic for deactivating one of said connecting means and activating the other of said connecting means to connect the source of power to the motor in accordance with the speed of the motor, and means connecting the speed responsive switch to the motor to be driven thereby.

7. In a shuttle car comprising a motor for operating traction means to propel the shuttle car, said motor being adapted to operate in a low speed range in which the motor delivers a high torque and a high speed range in which the motor delivers a low torque, said motor having a speed-torque characteristic common to the low speed range and the high speed range, said motor comprising electrical terminals for connecting a source of power to the motor to drive the motor, a low speed contactor for selectively connecting the source of power to the motor terminals to drive the motor in the low speed range, a high speed contactor for selectively connecting the source of power to the motor terminals to drive the motor in the high speed range, and a control circuit including means for alternately operating said low speed and high speed contactors, said control circuit including speed responsive means operative at a motor speed at least approximately equal to the motor speed at said common speed-torque characteristic for activating said operating means to deactivate one of said contactors and to activate the other of said contactors to connect the source of power to the motor terminals in accordance with the speed of the motor.

8. In a shuttle car comprising a motor for operating traction means to propel the shuttle car, said motor being adapted to operate in a low speed range in which the motor delivers a high torque and a high speed range in which the motor delivers a low torque, said motor having a speed-torque characteristic common to the low speed range and the high speed range, said motor comprising electrical terminals for connecting a source of power to the motor to drive the motor, a low speed contactor for selectively connecting the source of power to the motor terminals to drive the motor in the low speed range, a high speed contactor for selectively connecting the source of power to the motor terminals to drive the motor in the high speed range, and a control circuit for said low speed and high speed contactors, said control circuit including means for alternately operating said low speed and high speed contactors, and a speed responsive switch operative at a motor speed at least approximately equal to the motor speed at said common speed-torque characteristic for activating said operating means to deactivate one of said contactors and to activate the other of said contactors to connect the source of power to the motor terminals in accordance with the speed of the motor.

9. In a shuttle car comprising a motor for operating traction means to propel the shuttle car, said motor being adapted to operate in a low speed range in which the motor delivers a high torque and a high speed range in which the motor delivers a low torque, said motor having a speed-torque characteristic common to the low speed range and the high speed range, said motor comprising electrical terminals for connecting a source of power to the motor to drive the motor, a low speed contactor for selectively connecting the source of power to the motor terminals to drive the motor in the low speed range, a high speed contactor for selectively connecting the source of power to the motor terminals to drive the motor in the high speed range, a contactor coil for each contactor to operate the contactors, a control circuit including said contactor coils for alternately operating said low speed and high speed contactors, alternately operable switch means for alternately energizing said contactor coils, and a speed responsive switch operative at a motor speed at least approximately equal to the motor speed at said common speed-torque characteristic for actuating said switch means to deactivate one of said contactors and to activate the other of said contactors to connect the source of power to the motor terminals in accordance with the speed of the motor.

10. In a shuttle car comprising a motor for operating traction means to propel the shuttle car, said motor being adapted to operate in a low speed range in which the motor delivers a high torque and a high speed range in which the motor delivers a low torque, said motor having a speed-torque characteristic common to the low speed range and the high speed range, said motor comprising electrical terminals for connecting a source of power to the motor to drive the motor, a low speed contactor for selectively connecting the source of power to the motor terminals to drive the motor in the low speed range, a high speed contactor for selectively connecting the source of power to the motor terminals to drive the motor in the high speed range, a contactor coil for each contactor to operate the contactors, a control circuit including said contactor coils for alternately operating said low speed and high speed contactors, alternately operable switch means for alternately energizing said contactor coils, a control relay for actuating said alternately operable switch means, and a speed responsive switch operative at a motor speed at least approximately equal to the motor speed at said common speed-torque characteristic for energizing said control relay to deactivate one of said contactors and to activate the other of said contactors to connect the source of power to the motor terminals in accordance with the speed of the motor.

References Cited in the file of this patent

UNITED STATES PATENTS 1,313,688     Henderson     Aug. 19, 1919